(12) United States Patent
Ohms et al.

(10) Patent No.: US 10,064,332 B1
(45) Date of Patent: Sep. 4, 2018

(54) MONITOR FOR SLIP CLUTCHES

(71) Applicant: CNH Industrial America LLC, New Holland, PA (US)

(72) Inventors: Travis Ohms, Davenport, IA (US); Dan L. Garland, Solon, IA (US); Jonathan Ricketts, Coal Valley, IL (US); Thamilselvan Karuppannan, Davenport, IA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/450,696

(22) Filed: Mar. 6, 2017

(51) Int. Cl.
  *B60J 1/00* (2006.01)
  *A01D 41/127* (2006.01)
  *A01D 45/02* (2006.01)
  *A01D 82/00* (2006.01)

(52) U.S. Cl.
  CPC ......... *A01D 41/127* (2013.01); *A01D 45/021* (2013.01); *A01D 82/00* (2013.01)

(58) Field of Classification Search
  CPC ..... A01D 41/127; A01D 82/00; A01D 45/021
  See application file for complete search history.

(56) References Cited

U.S. PATENT DOCUMENTS

| | | | |
|---|---|---|---|
| 3,756,042 A | 9/1973 | Heth et al. | |
| 4,282,702 A | 8/1981 | McBee | |
| 5,083,976 A | 1/1992 | McClure et al. | |
| 6,843,044 B2 | 1/2005 | Clauss | |
| 7,028,454 B2 | 4/2006 | Kuissi et al. | |
| 7,739,861 B2 | 6/2010 | Mackin | |
| 9,807,933 B2 * | 11/2017 | Boyd | A01D 41/141 |
| 2002/0107625 A1 * | 8/2002 | Beck | A01D 41/127 701/50 |
| 2007/0293159 A1 * | 12/2007 | Etelapera | H04M 1/19 455/73 |
| 2010/0066555 A1 * | 3/2010 | Gram-Hansen | F03D 17/00 340/679 |

(Continued)

FOREIGN PATENT DOCUMENTS

WO  2013/012073 A1  1/2013

OTHER PUBLICATIONS

International Search Report and Written Opinion for PCT/US2018/021136, dated May 22, 2018 (13 pages).

*Primary Examiner* — Erin M File
(74) *Attorney, Agent, or Firm* — Peter K. Zacharias; Patrick M. Sheldrake (57) ABSTRACT

A system and method for detecting a malfunction in a harvesting machine includes a sensor for mounting to the harvesting machine. The sensor is configured to measure a magnitude of a mechanical wave produced in the harvesting machine, and output a signal based on the magnitude. A controller receives the signal from the sensor. The controller is configured to process the signal and generate an alarm signal when a threshold is exceeded. An alarm unit is configured to receive the alarm signal from the controller when the threshold value is exceeded, and output an alarm to alert the operator of the malfunction. The malfunction can be a slipped clutch caused by a jammed condition, or other anomaly that generates a mechanical wave. The mechanical wave can be a sound wave or mechanical vibration traveling through one or more parts of the harvesting machine.

19 Claims, 4 Drawing Sheets

(56) References Cited

U.S. PATENT DOCUMENTS

| | | | |
|---|---|---|---|
| 2011/0267456 A1* | 11/2011 | Adermann | H04N 7/181 348/135 |
| 2012/0215394 A1* | 8/2012 | Wang | A01D 41/1278 701/24 |
| 2012/0321464 A1* | 12/2012 | Andersen | F03D 17/00 416/1 |
| 2014/0208851 A1* | 7/2014 | Bischoff | A01D 41/1273 73/593 |
| 2015/0327440 A1* | 11/2015 | Dybro | A01D 75/00 73/862.541 |
| 2016/0029558 A1* | 2/2016 | Dybro | A01B 79/005 56/1 |
| 2016/0106038 A1* | 4/2016 | Boyd | A01D 41/141 56/10.4 |

\* cited by examiner

MONITOR FOR SLIP CLUTCHES

FIELD OF THE INVENTION

The present invention pertains to corn heads on agricultural combines or harvesters and, more specifically, to a system for detecting a malfunction in the corn head and for alerting the operator of the malfunction.

BACKGROUND

An agricultural combine is a machine used to harvest a variety of crops from a field. When corn is to be harvested, the combine is equipped with a corn head assembly or "corn head" at the front of the machine. The corn head includes a series of row dividers that guide corn stalks into respective row units as the combine advances over the corn stalks. The corn stalks are guided in each row unit to ear separation chambers or stripping plates which strip the ears of corn from the stalks. Some corn heads feature chopping mechanisms or "choppers" with rotating blades for cutting and shredding the stalks after the ears are stripped from the stalks. The ears are then conveyed rearwardly to a trough containing an auger. The auger conveys the ears to a feederhouse that feeds the ears into the combine. The ears are then threshed, cleaned and temporarily stored in a grain tank for temporary holding.

Row units are often driven by a drive shaft that extends through all of the row units in a direction transverse to a forward direction of movement of the combine. Choppers are also driven by a drive shaft, which may be the same drive shaft that drives the row units, or a different drive shaft. It is not uncommon for a row unit or chopper to become jammed with crop material during operation, preventing the row unit or chopper from operating. In such a case, the slip clutch that connects the drive shaft to the jammed row unit or chopper disengages to protect the drive shaft and upstream components from overload. The slipped clutch allows the drive shaft to continue rotating, but no more power is delivered to the jammed row unit or chopper.

If a slipped clutch is not detected and addressed in time, the clutch can become damaged beyond repair. In addition, the combine may continue to operate in a partially disabled condition. Unfortunately, slip clutches are concealed in the corn head and not visible to the operator during operation of the combine. Therefore, the operator cannot always see when a clutch is slipping from their vantage point inside the driving cab.

When a clutch slips, the rotational speed of the row unit drive shaft or chopper drive shaft changes. Therefore, one option for detecting a slipped clutch is to install speed sensors to monitor the speed of each row unit and chopper. This approach is not practical, however, because it requires the installation of a speed sensor at each row unit and each chopper, which can be expensive to install and maintain.

U.S. Pat. No. 7,739,861 describes a system that detects clutch slippage using a vibration sensor based on vibration frequency. A single vibration sensor can be placed in the corn head to detect vibration frequencies associated with a slipped clutch. The vibration sensor measures vibration frequency and conveys the measurements to a band pass filter by way of an analog to digital converter. Band passed frequencies are examined by a comparator to determine if the frequencies exceed a certain threshold. If the band passed frequencies exceed the threshold, an audio or visual indication is provided to alert the operator of a slipping clutch.

One of the drawbacks of frequency-based vibration analysis is that the system requires many components, sensors and inputs to work properly. As pointed out in U.S. Pat. No. 7,739,861, there are many sources of vibrations in a corn head frame during a harvesting operation. Unless extraneous vibrations are eliminated, the extraneous vibrations (or "noise") prevent the processing unit from determining when a slip clutch is slipping. For this reason, systems that utilize frequency-based vibration analysis include an adjustable band pass filter. The pass band of the filter is centered about a "predominant frequency" representative of vibration frequencies that are produced when a monitored clutch slips. The vibration frequency produced by a slipped clutch is a product of the rotational speed of the drive shaft and the number of teeth in the clutch. Drive shaft speed is not constant, of course, but can be adjusted by the operator to accommodate different operating conditions. As a result, the vibration frequency caused by a slipping clutch is not a constant, but varies depending on the speed of the drive shaft. The predominant frequency for the pass band filter must therefore adapt to changing rotational speeds of the drive shaft. For this reason, frequency-based systems require a speed sensor on the drive shaft to continually measure drive shaft rotation and adjust the band pass so that only frequencies associated with slipping clutches are passed. In addition, information about the type of slip clutch (e.g. number of teeth) must be input into the controller to calculate the predominant frequency. Consequently, frequency-based vibration monitoring systems require many more components, sensors and data inputs to function, and involve constant processing of data by the controller.

There remains a need for a more streamlined, efficient, reliable and cost-effective system for detecting a clutch slippage in a combine harvester, and for alerting an operator of the slippage.

SUMMARY

The drawbacks of conventional systems for detecting clutch slippages are addressed in many respects by mechanisms in accordance with the invention.

According to one embodiment of the invention, a system for detecting a malfunction in a harvesting machine includes at least one sensor for mounting to the harvesting machine. The at least one sensor can be configured to measure a magnitude of a mechanical wave produced in the harvesting machine, and output a signal based on the magnitude of the mechanical wave. The system can also include a controller for receiving the signal from the at least one sensor, the controller configured to process the signal and generate an alarm signal when a threshold is exceeded. The system can further include an alarm unit configured to receive the alarm signal from the controller when the threshold value is exceeded, and output an alarm to an operator to alert the operator of the malfunction.

According to another embodiment of the invention, the at least one sensor can include at least one sensor mounted in a corn head of the harvesting machine.

According to another embodiment of the invention, the at least one sensor can be mounted to the frame of the corn head.

According to another embodiment of the invention, the at least one sensor can be mounted in line with a drive shaft in the corn head.

According to another embodiment of the invention, the at least one sensor can include a plurality of sensors.

According to another embodiment of the invention, the corn head can include a plurality of zones.

According to another embodiment of the invention, a sensor can be located in each of the zones.

According to another embodiment of the invention, each sensor can be configured to measure a magnitude of a mechanical wave in its respective zone and generate a signal based on the magnitude of the mechanical wave in its respective zone.

According to another embodiment of the invention, the controller can be configured to receive a signal from each sensor, and generate at least one alarm signal when a magnitude of a mechanical wave exceeds a threshold value.

According to another embodiment of the invention, the alarm unit can be configured to receive the at least one alarm signal from the controller when the threshold value is exceeded, and output at least one alarm to an operator to alert the operator of a malfunction in at least one of the zones.

According to another embodiment of the invention, the alarm unit can be configured to output a plurality of different alarms, each of the plurality of different alarms having a unique alarm characteristic associated with one of the zones.

According to another embodiment of the invention, the at least one sensor can include a sound level meter and the mechanical wave can be a sound wave.

According to another embodiment of the invention, the threshold value for generating an alarm signal can be between about 105 db to about 110 db.

According to another embodiment of the invention, the at least one sensor can include a piezoelectric accelerometer, and the magnitude of the mechanical wave can be an acceleration magnitude.

According to another embodiment of the invention, the signal from the at least one sensor can include an electrical signal in mV based on the acceleration magnitude measured by the piezoelectric accelerometer.

According to another embodiment of the invention, the controller can be configured to create a running average based on electrical signals received from the piezoelectric accelerometer.

According to another embodiment of the invention, the controller can generate an alarm signal when the running average based on electrical signals received from the piezoelectric accelerometer exceeds the threshold value.

According to another embodiment of the invention, the controller can be configured to count a number of electrical signals received from the piezoelectric accelerometer that are above the threshold value, and generate an alarm signal when the number of electrical signals reaches a certain number N.

According to another embodiment of the invention, the number N can be adjustable to adjust the sensitivity of the system.

According to another embodiment of the invention, the alarm signal can include a visual message on a display unit in the driver cabin.

According to another embodiment of the invention, the alarm signal can include an audible alarm in the driver cabin.

According to another embodiment of the invention, a method for detecting a malfunction in a harvesting combine and alerting an operator of a malfunction can include the steps of:

placing one or more sensors in a corn head attached to the harvesting combine;

measuring a magnitude of a mechanical wave property in the corn head, using a sensor located in the corn head;

outputting a signal from the sensor based on the magnitude of the mechanical wave property, the signal carrying data corresponding to the magnitude of the mechanical wave property;

comparing the data corresponding to the magnitude of the mechanical wave property with a threshold value that is input into the controller, and sending an alarm signal to an alarm unit if the data corresponding to the magnitude of the mechanical wave property exceeds the threshold value to alert an operator of a malfunction.

BRIEF DESCRIPTION OF THE DRAWINGS

For the purpose of illustration, there are shown in the drawings certain embodiments of the present invention. It should be understood, however, that the invention is not limited to the precise components, arrangements, dimensions, and instruments shown. Like numerals indicate like elements throughout the drawings. In the drawings.

DETAILED DESCRIPTION

Figure 1:
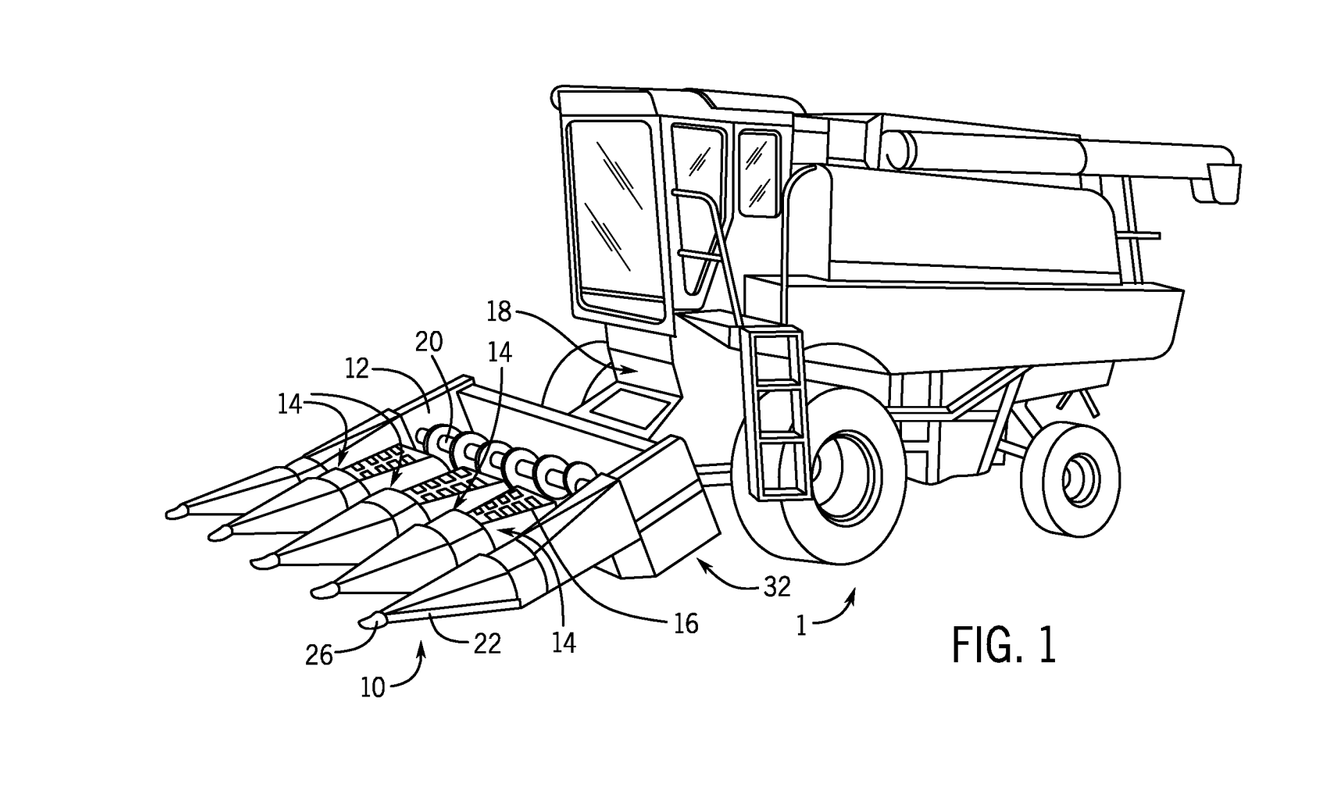
FIG. 1 illustrates a perspective view of an exemplary embodiment of an agricultural combine, the combine comprising a system for detecting a malfunction in accordance with an exemplary embodiment of the present invention.

Referring now to the drawings, wherein preferred embodiments of the present invention are shown, FIG. 1 illustrates a corn head assembly 10 of the present invention as applied to an agricultural combine or combine harvester 1. The corn head assembly 10 is shown to be operatively connected to the combine harvester 1 for harvesting corn and feeding the corn to a feederhouse 18. Such feederhouses and harvesting operations of the combine harvester are known in the art, and a further detailed description of their structure, function and operation is not necessary for a complete understanding of the present invention. However, typical corn head assemblies that may be applicable to the present invention are disclosed in U.S. Pat. Nos. 3,808,783 and 3,759,021, the entire disclosures of which are incorporated by reference herein. A variety of row dividers that may also be applicable to the present invention are disclosed in U.S. Pat. No. 5,195,309, the entire disclosure of which is incorporated by reference herein.

Corn head assembly 10 includes a frame 12 for mounting to a forward end of the combine harvester 1. A plurality of row units 14 extend forwardly from the frame 12. A hood 16 extends between each adjacent pair of row units 14. Each hood 16 is generally configured as a convex shaped covering that extends between the adjacent pair of row units 14 to cover the space between said pair of row units 14 to prevent the loss of grain from falling to the ground during harvesting operations. Chopper units or "choppers" (not shown) are also located beneath the hood.

Combine harvester 1 also includes a conveyor 20 to convey grain that is separated from the stalk by the row units 14 to the feederhouse 18. Conveyor 20 is connected to frame 12 about its side walls and is situated within the channel extending between the side walls of the frame 12. Each row unit 14 includes a stripping plate (also called a deck plate) mounted to a row unit frame. The stripping plate has a length that extends forwardly from the frame and extends a length substantially the same as a longitudinal length of its respective hood 16. In operation, crop material is stripped from the stalks as they are pulled within the row unit 14 and enter a gap formed by the stripping plates. The stripped grain is then conveyed to the conveyor 20 owing to the flow of crop material in a rearward direction during a harvesting operation. The stalks move downwardly into lower parts of the corn head where the stalks are shredded by the choppers. Shredded stalks exit through the bottom of the corn head.

Figure 2:
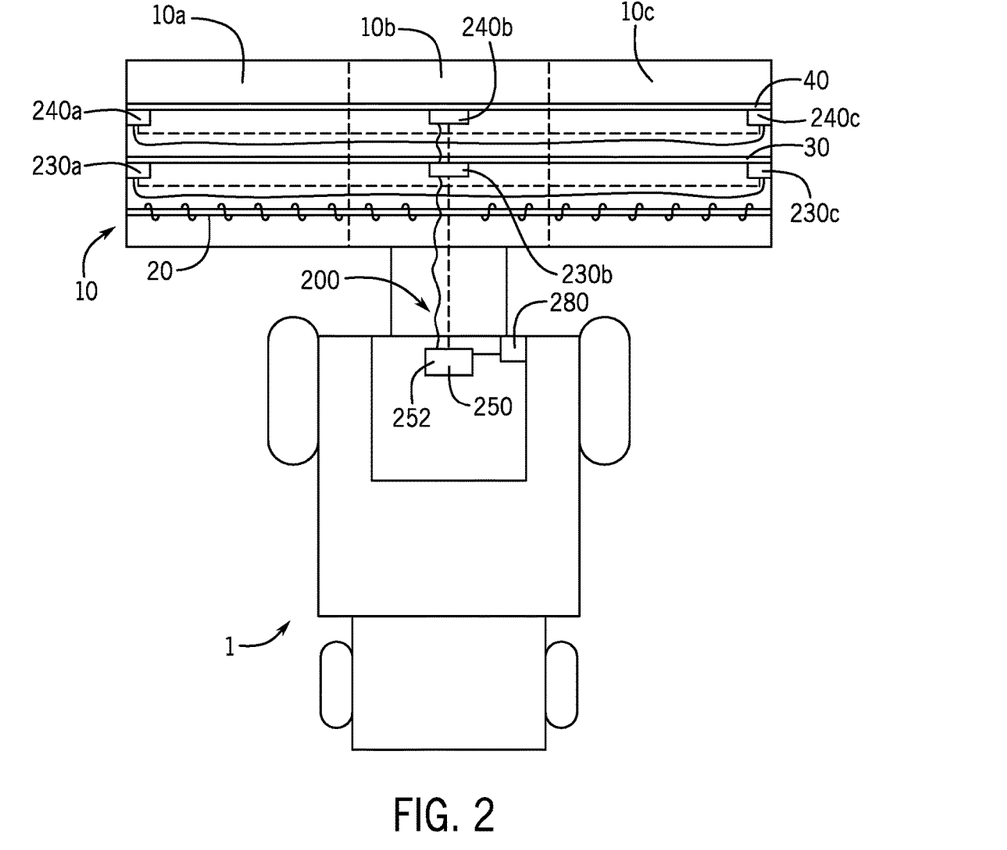
FIG. 2 illustrates a plan view of the agricultural combine and system of FIG. 1, with features removed for clarity.

Referring to FIG. 2, combine harvester 1 includes a system 200 for detecting one or more system malfunctions in corn head 10. System malfunctions can include, but are not limited to, jammed conditions in row units, jammed conditions in chopper units, or damaged functional components in the corn head 10. This description primarily describes how systems of the invention can detect jammed conditions by determining when one or more slip clutches slip. However, it will be understood that systems in accordance with the invention are not limited to detecting clutch slippages or jammed conditions in a corn head. Systems in accordance with the invention can also detect other problems or anomalies occurring in a combine harvester which relate to different components, and/or are unrelated to jammed conditions. For purposes of this description, the term "malfunction" means any adverse condition in a combine harvester that generates a mechanical wave property that is measurable by systems in accordance with the invention.

Jammed conditions in a corn head might arise from crop material that is jammed in one or more row units and/or one or more choppers. Combine harvester 1 includes a first drive shaft 30 that drives the row units 14, and a second drive shaft 40 that drives the choppers. Each row unit 14 is connected to drive shaft 30 by a slip clutch (not shown for clarity). Similarly, each chopper is connected to drive shaft 40 by a slip clutch (also not shown for clarity). System 200 is operable to detect a jammed condition by determining when one or more of the slip clutches slip.

Systems in accordance with the invention utilize one or more sensors that are configured to measure a property of a mechanical wave produced by a slip clutch or other malfunctioning component, and output a signal based on that property. A system in accordance with the invention can utilize a single sensor for monitoring the operation of the corn head assembly, and determining when a malfunction occurs. By using only one sensor, systems in accordance with the invention provide a streamlined and low-cost system with very few components that require installation and maintenance.

In larger corn heads, a jammed condition, malfunctioning component or other anomaly occurring at one end of the corn head may not always be detectable by a sensor located at the opposite end of the corn head. Therefore, some systems in accordance with the invention can utilize two or more sensors to monitor the operation of the corn head assembly. The use of multiple sensors can be desirable in larger corn head assemblies, or corn heads that feature a large number of row units or choppers. Where multiple sensors are used, the sensors can be placed at the same location in the corn head assembly, or arranged at different locations of the corn head assembly. The sensor or sensors can be attached to the combine harvester in various ways, including but not limited to mounting on a wall inside the corn head frame, mounting in line with a drive shaft in the corn head, mounting within a tube of the structure, mounting on a tool bar, or other arrangements.

In system 200, for example, there are a total of six sensors 230*a*, 230*b*, 230*c*, 240*a*, 240*b* and 240*c*. Sensors 230*a*, 230*b* and 230*c* are mounted on or in proximity to first drive shaft 30. Sensors 240*a*, 240*b* and 240*c* are mounted on or in proximity to second drive shaft 40. Sensors 230*a*, 230*c*, 240*a* and 240*c* are mounted on inner side walls of frame 12 using bolts, brackets or other suitable mounting means. Sensors 230*b* and 240*b* are installed in proximity to mid-sections of the drive shafts 30 and 40, respectively. Corn head 10 is divided into three different zones: 10*a*, 10*b* and 10*c*. Sensors 230*a* and 240*a* are placed in zone 10*a*, sensors 230*b* and 240*b* are placed in zone 10*b*, and sensors 230*c* and 240*c* are placed in zone 10*c*. In this arrangement, each sensor can be configured to detect a jammed condition or malfunctioning component in its respective zone, and communicate the location of that jammed condition or malfunctioning component to the operator.

Sensors 230*a*, 230*b*, 230*c*, 240*a*, 240*b* and 240*c* each measure a property of a mechanical wave produced in its respective zone. As will be explained, the mechanical wave can be in various forms, including a sound wave traveling through air, or a mechanical vibration traveling through one or more parts of the corn head 10, including but not limited to the frame, shafts, clutches, gear boxes, and/or other components. Measurements of wave properties can be taken continuously during operation of the combine harvester 1, or only at selected times, such as when crop material is received in the row units.

After measuring the property of a mechanical wave, sensors 230*a*, 230*b*, 230*c*, 240*a*, 240*b* and 240*c* each send an output signal based on the property of the mechanical wave to a controller 250. Controller 250 includes a microcomputer 252 with a signal processing unit and software configured to receive a signal from each sensor, process the signal, and generate an alarm signal when a certain threshold is exceeded. System 200 also includes an alarm unit 280 configured to receive the alarm signal from controller 250 when the threshold value is exceeded, and output an alarm to an operator to alert the operator of a slipped clutch.

Controllers in accordance with the invention can be built in to each sensor, or can be separate from each sensor in a single centralized location. In the case of a single centralized controller, the controller can be a separate unit that operates independently of all systems in the combine harvester. Alternatively, the centralized controller can be integrated with other systems or components of the combine harvester.

Alarm units in accordance with the invention can be located on or inside the combine harvester at one or more locations that attract the attention of the operator, including but not limited to one or more locations in the driver cab, such as a location adjacent to the controls or on the windshield. In addition, alarm units in accordance with the invention can be configured to output one or more audio and/or visual signals, including alarm bells, lights, and/or information that appears on an electronic display unit in the driver cab. Information appearing on an electronic display unit can include textual and/or graphical information on a display screen that positively identifies the occurrence of a malfunction, and the zone or section of the corn head where the malfunction is located.

Controllers in accordance with the invention can be configured to process signals received from sensors and output specific alarm signals to the alarm unit to generate a unique alarm that informs the operator of where the malfunction is occurring. For example, controller 250 is configured to process output signals from sensors 230a, 230b, 230c, 240a, 240b and 240c and output a specific alarm signal to alarm unit 280, said specific alarm signal including information that identifies each zone. Alarm unit 280 is configured to output a plurality of different alarms, each of the different alarms having a unique alarm characteristic associated with one of the zones. The alarm signal sent to alarm unit 280 can include an instruction to generate a specific alarm, such as a unique sound and/or a specific message on a display unit that corresponds to or identifies the zone(s) containing a sensor which detects a malfunction.

As described previously, systems in accordance with the invention can monitor mechanical wave properties using only a single sensor in the corn head, and need not utilize multiple sensors as shown in FIG. 2. In some instances, it might be preferable to use only one sensor, such as instances where zone monitoring is not practical or not required.

Systems in accordance with the invention measure the magnitude of mechanical wave properties, as opposed to frequencies or drive shaft speeds. Therefore, systems in accordance with the invention do not require installation of speed sensors on each row unit and chopper, or data filters to filter out frequencies.

Figure 3:
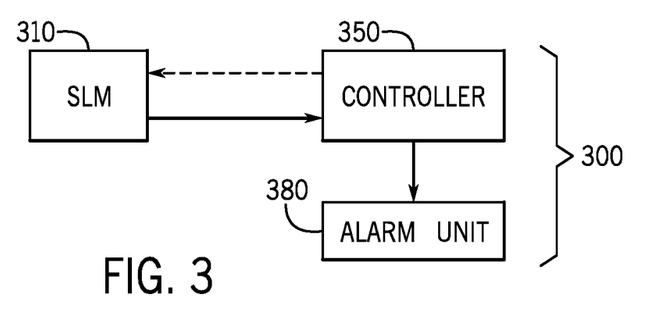
FIG. 3 is a block diagram of a system for detecting a malfunction in an agricultural combine in accordance with an exemplary embodiment of the invention.

FIG. 3 provides a block diagram illustrating one embodiment of a system 300 that detects clutch slippages by measuring sound level in the corn head assembly. Many corn head assemblies utilize radial pin clutches that make a distinct ratcheting noise when the clutches slip. This ratcheting noise increases the noise level in the corn head, generating sound waves that can be detected by a sound pressure level meter, or sound level meter ("SLM"). In a conventional SLM with microphone, the diaphragm of the microphone will respond to changes in air pressure caused by the sound waves from the ratcheting noise. Movement of the diaphragm is converted to an electrical signal which can be sent to a controller to convey the sound pressure level in decibels. A variety of SLMs can be utilized in accordance with the invention, including but not limited to commercially available instruments manufactured by 3M, Cirrus Research, PLC, and Casella.

Systems that measure sound level in accordance with the invention can include a single SLM mounted in the corn head. Alternatively, systems that measure sound in accordance with the invention can include a plurality of SLMs mounted in the corn head. Where a plurality of SLMs are used, the SLMs can be arranged in the manner shown in FIG. 2, with the corn head divided into three zones that aid the operator in determining the location of an SLM that detects a slipped clutch. For simplicity, system 300 is shown in FIG. 3 with a single SLM 310, but with the understanding that more than one SLM can be used.

System 300 includes a controller 350 configured to receive an output signal from SLM 310. The output signal from SLM 310 contains data indicating the sound level measured by SLM 310 in decibels. Controller 350 includes a microcomputer and software that can be programmed to compare a sound level measurement from SLM 310 and compare the sound level measurement to a threshold value inputted into the computer. If the sound level measurement from SLM 310 exceeds the threshold value, controller 350 sends an alarm signal to an alarm unit 380. Alarm unit 380 is configured to receive an alarm signal from controller 350 when the threshold value is exceeded, and output an alarm that alerts the operator of a slipped clutch.

The threshold value can depend on various parameters. A typical threshold value that is inputted into the controller will account for sound levels measured in the corn head assembly during normal operation, and any variability in sound levels that occur during normal operation of the combine harvester. A suitable threshold value can be selected to be a certain percentage higher than the highest sound level measured during normal operation of the combine harvester. For example, noise levels in a corn head during normal operation of the combine harvester can be in the range of about 100 db to about 105 db. The noise level in the same corn head may rise by an additional 5 decibels or more when a clutch begins to slip. In such a case, a threshold value such as 110 db can be inputted into controller 350. Controller 350 is configured to receive sound level measurements from SLM 310, compare each sound level measurement to the threshold value of 110 db, and output an alarm signal to alarm unit 380 when any one sound level measurement meets or exceeds 110 db. It will be understood that the threshold of 110 db is just one example of a threshold value that can be used, and that higher or lower threshold values can also be appropriate for systems in accordance with the invention that monitor sound level.

Figure 4:
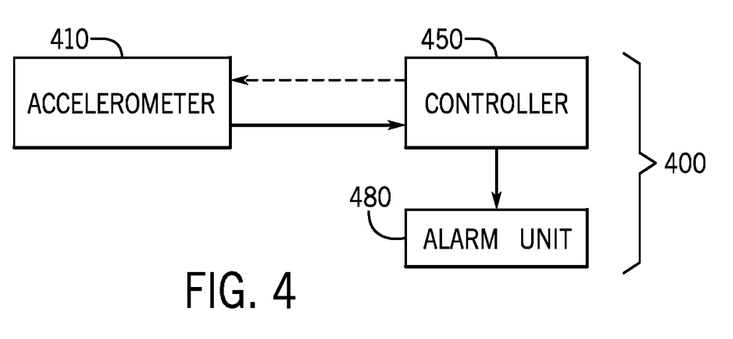
FIG. 4 is a block diagram of a system for detecting a malfunction in an agricultural combine in accordance with another exemplary embodiment of the invention.

FIG. 4 provides a block diagram illustrating another embodiment of a system 400 that detects clutch slippages by measuring the magnitude of mechanical vibrations through the frame of the corn head assembly. When radial pin clutches slip, the ratcheting of the clutch creates mechanical vibration in the frame of the corn head that is distinct from vibrations which normally occur during operation without clutch slippage. One or more sensors placed on the frame can be configured to monitor the magnitude of mechanical vibrations through the frame and send a signal corresponding to the vibrations. A variety of sensors can be used to monitor the magnitude of vibration. System 400 uses a piezoelectric accelerometer or knock sensor 410. For simplicity, system 400 is shown with a single piezoelectric accelerometer 410, but with the understanding that more than one piezoelectric accelerometer can be used.

Piezoelectric accelerometers in accordance with the invention can be conventional accelerometers with spring elements that are displaceable in response to vibrations. Piezoelectric accelerometer 410 measures the magnitude of acceleration caused by vibration through the corn head frame on a continual basis, and converts each measurement to an electrical signal in mV. The electrical signals are sent to a controller 450 which processes the signals and determines whether a slipped clutch has occurred. When a slip clutch slips, the magnitude of accelerations in the corn head increase significantly, resulting in output signals with elevated voltages that controller 450 can identify.

Controllers in accordance with the invention can include a microcomputer and software that can be programmed to compare electrical signals received from a piezoelectric accelerometer, and compare the signals to a threshold value input into the computer. The threshold can be a preset threshold in mV, based on an elevated voltage that would be received from the piezoelectric accelerometer 410 during a clutch slippage. Controller 450 includes a microcomputer and software configured to log electrical signal data over time, and trigger an alarm signal when the logged data indicates that a clutch is slipping. Data can be processed in a number of different ways to determine a clutch slippage event. For example, controller 450 can be programmed to sample data received from the piezoelectric accelerometer 410 over a fixed time period, and count the number of data points within that time period that exceed the threshold. If the number of data points exceeding the threshold is more than a certain number or "alarm threshold", the controller outputs an alarm signal to an alarm unit 480. The following example illustrates one possible system.

Example

Sampling Rate: 2500 Hz
Default Threshold: 2,337 mV
Default Sensitivity:
Sample Time: 0.25 second
Sample Size: 625 samples
Alarm Threshold (N): 40 samples In the above example, controller 450 samples the data received from a piezoelectric accelerometer 625 times, over period of 0.25 seconds. The Default Threshold of 2,337 mV is based on a predetermined threshold of 123 mV that would be output from a piezoelectric accelerometer 410 during a clutch slippage, and amplified by a factor of 19 when the signal enters controller 450. If controller 450 identifies 40 or more data points that exceed 2,337 mV within the 0.25 second Sample Time, then the controller outputs an alarm signal to alarm unit 480. This method allows the sensitivity of the system to be adjusted to avoid false alarms that might occur if the system is too sensitive, and avoid undetected slippages that might occur if the system is not sensitive enough. Sensitivity can be adjusted by changing one or more variables, including but not limited to the Alarm Threshold, Sample Time and Sample Size.

In an alternate example, controller 450 creates a running average of data received from piezoelectric accelerometer and outputs an alarm signal to alarm unit 480 when the running average exceeds a default threshold. Other types of data sampling and comparison can also be utilized to identify when a clutch slippage, component malfunction or other anomaly occurs. The above-described examples of data sampling can also be used in systems that measure sound levels, including but not limited to system 300.

System 400 monitors magnitude of acceleration caused by vibrations through the frame, as opposed to frequency. By monitoring magnitudes, systems in accordance with the invention avoid the need for additional inputs and sensors that are required in frequency-based vibration monitoring systems. As described earlier, frequency-based systems require speed sensors on drive shafts, and band pass filters with constant adjustment of the predominant frequency to adapt to different rotational speeds of the drive shaft(s). Frequency-based systems also require continual processing of data from speed sensors and accelerometers. System 400 does not have these processing requirements and does not require any external input from the functional systems of the corn head, such as line speed. As a result, system 400 provides a much more cost effective and reliable system for detecting clutch slippage based on vibration analysis, as there are fewer components to install, maintain and repair than with frequency-based systems.

Figure 5:
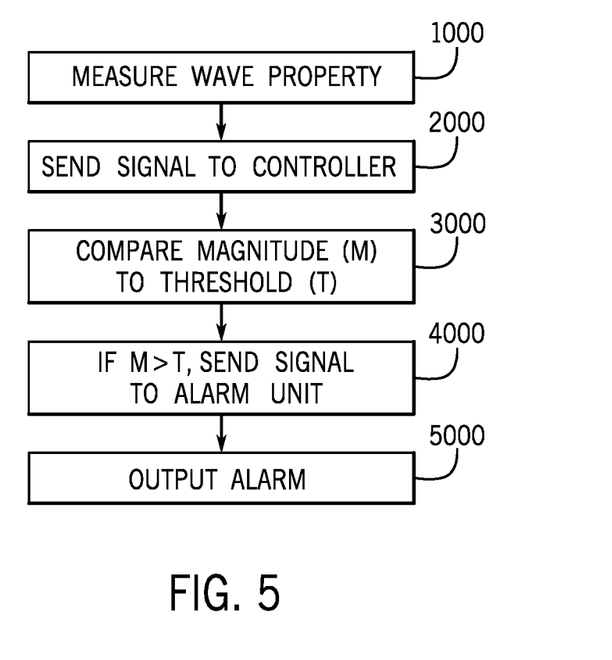
FIG. 5 is a block diagram illustrating a method for detecting a malfunction in an agricultural combine in accordance with an exemplary embodiment of the invention.

Referring now to FIG. 5, a method for detecting a system malfunction in a corn head, such as a slipped clutch, is shown in a block diagram. In step 1000, a property of a mechanical wave is measured in terms of magnitude by a sensor in the corn head. In step 2000, the sensor outputs an electrical signal based on the measurement to a controller. The electrical signal carries data corresponding to the magnitude of the mechanical wave property. In step 3000, the controller compares the magnitude of the mechanical wave property (M) against a threshold value (T) to determine whether the magnitude exceeds the threshold value. In step 4000, the controller sends an alarm signal to an alarm unit in the event that the magnitude of the mechanical wave property exceeds the threshold value. Finally, in step 5000, the alarm unit outputs an alarm, which may include one or more audio and/or visual alarm indicators, to alert an operator of the system malfunction.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A harvesting machine comprising:
   a combine with a corn head including at least one slip clutch;
   at least one sensor mounted to the corn head, each of the at least one sensor positioned and configured to measure a magnitude of a mechanical wave produced in the harvesting machine by one or more of the at least one slip clutch of the corn head, and output a signal based on the magnitude of the mechanical wave;
   a controller for receiving the signal from each of the at least one sensor, the controller configured to process the signal from each of the at least one sensor and generate an alarm signal when a threshold is exceeded indicating slippage of one or more of the at least one slid clutch; and
   an alarm unit configured to receive the alarm signal from the controller when the threshold value is exceeded, and output an alarm to an operator to alert the operator of the indicated slippage.

2. The harvesting machine of claim 1, wherein the at least one sensor is mounted to the frame of a corn head.

3. The harvesting machine of claim 1, wherein the at least one sensor is mounted in line with a drive shaft in the corn head.

4. The harvesting machine of claim 1, wherein the at least one sensor comprises a plurality of sensors, and wherein the corn head comprises a plurality of zones, each sensor located in one of the zones.

5. The system of claim 4, wherein each sensor is configured to measure a magnitude of a mechanical wave in its respective zone and generate a signal based on said magnitude of said mechanical wave in said respective zone.

6. The harvesting machine of claim 5, wherein the controller is configured to receive a signal from each sensor, and generate at least one alarm signal when a magnitude of a mechanical wave exceeds a threshold value.

7. The harvesting machine of claim 6, wherein the alarm unit is configured to receive the at least one alarm signal from the controller when the threshold value is exceeded, and output at least one alarm to an operator to alert the operator of a malfunction in at least one of the zones.

8. The harvesting machine of claim 7, wherein the alarm unit is configured to output a plurality of different alarms, each of the plurality of different alarms comprising a unique alarm characteristic associated with one of the zones.

9. The harvesting machine of claim 1, wherein the at least one sensor comprises a sound level meter and the mechanical wave is a sound wave.

10. The harvesting machine of claim 9, wherein the magnitude of the mechanical wave is in decibels, and the threshold value is between about 105 db to about 110 db.

11. The harvesting machine of claim 1, wherein the at least one sensor comprises a piezoelectric accelerometer, and the magnitude of the mechanical wave is an acceleration magnitude.

12. The harvesting machine of claim 11, wherein the signal from the at least one sensor comprises an electrical signal in mV based on the acceleration magnitude measured by the piezoelectric accelerometer.

13. The harvesting machine of claim 12, wherein the controller is configured to create a running average based on electrical signals received from the piezoelectric accelerometer.

14. The harvesting machine of claim 13, wherein the controller generates the alarm signal when the running average based on electrical signals received from the piezoelectric accelerometer exceeds the threshold value.

15. The harvesting machine of claim 12, wherein the controller is configured to count a number of electrical signals received from the piezoelectric accelerometer that are above the threshold value, and generate the alarm signal when the number of electrical signals reaches a certain number N.

16. The harvesting machine of claim 15, wherein the number N is adjustable to adjust sensitivity of the system.

17. The harvesting machine of claim 1, wherein the alarm signal comprises a visual message on a display unit in the driver cabin.

18. The harvesting machine of claim 1, wherein the alarm signal comprises an audible alarm in the driver cabin.

19. A method for detecting a malfunction in a harvesting machine and alerting an operator of a malfunction, the method comprising the steps of:

placing one or more sensors in a corn head attached to the harvesting machine, the sensors configured to measure a magnitude of a mechanical wave produced in the harvesting machine by at least one slip clutch of the corn head;

measuring a magnitude of a mechanical wave property in the corn head, using the one or more sensors placed in the corn head;

outputting a signal from each of the sensor based on the magnitude of the mechanical wave property measured by the one or more sensors, the signal carrying data corresponding to the magnitude of the mechanical wave property;

comparing the data corresponding to the magnitude of the mechanical wave property with a threshold value that is input into a controller; and sending an alarm signal to an alarm unit if the data corresponding to the magnitude of the mechanical wave property exceeds the threshold value, indicating slippage of one or more of the at least one slip clutch, to alert an operator of the indicated slippage.

\* \* \* \* \*